US006958602B2

(12) United States Patent
Matsuura et al.

(10) Patent No.: US 6,958,602 B2
(45) Date of Patent: Oct. 25, 2005

(54) HIGH-ACCURACY 1X VARIABLE-RELUCTANCE RESOLVER

(75) Inventors: Mutsumi Matsuura, Tokyo (JP); Taiichi Miya, Tokyo (JP); Yoshihito Osanai, Nagano-ken (JP)

(73) Assignee: Minebea Co., Ltd., (JP)

( * ) Notice: Subject to any disclaimer, the term of this patent is extended or adjusted under 35 U.S.C. 154(b) by 0 days.

(21) Appl. No.: 11/065,456

(22) Filed: Feb. 25, 2005

(65) Prior Publication Data

US 2005/0212512 A1 Sep. 29, 2005

(30) Foreign Application Priority Data

Mar. 26, 2004 (JP) ............................ 2004-092930

(51) Int. Cl.[7] .......................... G01B 7/30; G01P 3/488
(52) U.S. Cl. .................. 324/207.25; 324/143; 310/168
(58) Field of Search .......................... 310/46, 166, 168, 310/171, 254, 261; 324/207.15, 207.16, 207.25, 324/244, 257–261, 144, 154 R, 143

(56) References Cited

U.S. PATENT DOCUMENTS 4,572,951 A * 2/1986 Toda et al. ............ 250/231.18
4,928,046 A * 5/1990 Karasawa .................. 318/654

FOREIGN PATENT DOCUMENTS

| | | |
|---|---|---|
| JP | 60-152251 | 8/1985 |
| JP | 03-148014 | 6/1991 |
| JP | 2001-183169 | 7/2001 |

* cited by examiner

*Primary Examiner*—Bot LeDynh
(74) *Attorney, Agent, or Firm*—Lorusso & Loud

(57) ABSTRACT

A high-accuracy, 1X VR resolver includes a first rotor portion having (N−1) salient poles, where N is an arbitrary integer not less than 3, a second rotor portion having N salient poles, a first stator portion having an input coil and an output coil for a shaft angle multiplier of (N−1)X are provided, and a second stator portion having an input coil and an output coil for a shaft angle multiplier of NX. A first resolver unit composed of the first rotor portion and the first stator portion, and a second resolver unit composed of the second rotor portion and the second stator portion are disposed in front and rear stages, respectively. The output coil of the stator portion in the front stage is connected to the input coil of the stator portion in the rear stage in such a manner that the output coil of the stator portion in the rear stage outputs an output signal for a shaft angle multiplier of 1X.

8 Claims, 3 Drawing Sheets

HIGH-ACCURACY 1X VARIABLE-RELUCTANCE RESOLVER

BACKGROUND OF THE INVENTION

1. Field of the Invention

The present invention relates to a high-accuracy, variable-reluctance (VR) resolver whose shaft angle multiplier is 1X and which is used for, for example, measurement or control of a rotational angle or position.

2. Description of the Related Art

A variable-reluctance (VR) resolver, which includes a stator having an excitation coil and output coils wound around its magnetic poles, and a rotor having an arbitrary salient pole shape, outputs a resolver signal, which is a two-phase voltage signal including a sin voltage signal and a cos voltage signal, which vary with a rotational angle of the rotor. Such a VR resolver must output a resolver signal whose shaft angle multiplier is 1X (hereinafter referred to as "1X resolver signal") and which serves as a reference for detection of an absolute position.

A VR resolver whose shaft angle multiplier is 1X (hereinafter referred to as "1X VR resolver") is formed from a set consisting of a stator stack and a rotor stack having an eccentric shape. In the case where the stator and the rotor are assembled in a misaligned state; i.e., the center axis of the rotor is deviated from the center axis of the stator, output voltage signals, which vary with the rotational angle of the rotor, greatly deteriorate in accuracy as compared with the designed output voltage signals.

The accuracy deterioration occurs for the following reason. In the case where the shaft angle multiplier of a resolver is 1X, the shape of the salient pole is determined to have a single peak within a single rotation (mechanical angle: 360 degrees) of a rotary shaft. Therefore, the change in radius of the salient pole per unit rotational angle becomes small, and thus, the amounts of change in the output voltage signals per unit rotational angle become small. Accordingly, even a small center deviation between the stator and the rotor produces large errors in the output signal voltages.

Meanwhile, machining accuracy may be increased in order to manufacture a high-accuracy 1X VR resolver. However, the machining accuracy can be increased only within a limited range. For example, it is said that the accuracy of such a 1X VR resolver can be increased only to a level of about ±2°. Further, increased accuracy inevitably results in an increase in cost, and makes mass production difficult.

Conventionally, an absolute-position detection apparatus which can solve the above-described problem has been proposed (see, for example, Japanese Patent Application Laid-Open (kokai) No. H03-148014). The absolute-position detection apparatus utilizes, in combination, a VR resolver whose shaft angle multiplier is 1X and in which the phase of a detection signal changes by 360 degrees when the rotary shaft rotates one turn (hereinafter referred to as "1X VR resolver") and a VR resolver whose shaft angle multiplier is NX and in which the phase of a detection signal changes by 360 degrees every time the rotary shaft rotates a 1/N turn (hereinafter referred to as "NX VR resolver"), where N is an arbitrary integer. In the apparatus, the 1X VR resolver detects a pole corresponding to the resolution (1/N turn), and the rotational angle position within the detected pole (an area corresponding to 1/N turn) is calculated on the basis of the detection signal from the NX VR resolver.

The term "shaft angle multiplier" refers to the ratio of an output electrical angle $\theta e$ of a VR resolver to an actual input mechanical angle $\theta m$ of the resolver, and in general, the mechanical angle $\theta m$ is obtained through division of the output electrical angle $\theta e$ by the shaft angle multiplier.

Even in the conventional apparatus which uses a 1X VR resolver and an NX VR resolver in combination, a detection signal output from the 1X VR resolver is still used as a reference. When a characteristic curve of a 1X digital signal obtained through R/D conversion (Resolver to Digital conversion) of the output voltage signal of the 1X VR resolver is drawn, its slope is small. This means that a small variation in input causes a large variation in output, so that output errors are easily generated. Moreover, when the shaft angle multiplier N of the NX VR resolver is increased (the number of salient poles is increased), a correct pole on the characteristic chart for the NX resolver may fail to be selected if the output of the 1X VR resolver does not change linearly, because of influence of errors. Therefore, a conventional apparatus cannot solve the problem involved in the conventional 1X VR resolver such that the detection signal is very likely to be influenced by errors.

Further, the conventional apparatus has a problem of increased size, because both the 1X VR resolver and the NX VR resolver are incorporated in the apparatus. Moreover, since the VR resolvers are connected together via a speed reduction mechanism, the conventional apparatus generates mechanical vibration and noise, and causes operational malfunctions as a result of wear.

There has been known another absolute-position detection apparatus which uses two VR resolvers; i.e., an NX VR resolver and an (N+1)X VR resolver, and which obtains a difference between saw tooth signals output from the VR resolvers to thereby produce a 1X resolver signal which continues over a predetermined period (see, for example, Japanese Patent Application Laid-Open (kokai) No. S60-152251).

However, since the above apparatus uses two VR resolvers, a task of adjusting their mutual relationship is required, and the overall size of the apparatus increases. In addition, the apparatus requires calculation processing means for converting the signals output from the NX VR resolver and the (N+1)X VR resolver to the 1X resolver signal, which results in an increase in cost, and therefore, the apparatus is not practical.

In order to reduce size, there has been proposed a position detection apparatus which employs a structure in which two resolver units each consisting of a stator and a rotor are provided in tandem.

Such a position detection apparatus including two resolver units (see, for example, Japanese Patent Application Laid-Open (kokai) No. 2001-183169) includes a first position detection section which outputs a first position detection signal that periodically changes P times per single revolution, and a second position detection section which outputs a second position detection signal that periodically changes (P−N) times per single revolution. The first and second position detection sections are disposed on a common rotation shaft. On the basis of the first and second position detection signals, first and second calculation sections output electrical angle signals of saw tooth shape which periodically change P times and (P−N) times, respectively, per single revolution. A third calculation section calculates a difference between the signals output from the two calculation sections. When the calculated difference is positive, the calculated difference is used as is. When the calculated difference is negative, an electrical angle of 360 degrees is added to the calculation result. Thus, the apparatus outputs a position detection signal which periodically changes N times per single revolution.

When a 1X resolver signal is obtained by making use of the apparatus disclosed in Japanese Patent Application Laid-Open (kokai) No. 2001-183169, the values of P and N are set such that the value of P−N is 1. When the values of P and N are increased, higher mechanical accuracy is required of, for example, magnetic pole teeth. Moreover, since the saw tooth signals are compared with each other at each timing, higher measurement accuracy is required, inducing the degrees of their inclinations. Therefore, this apparatus is also impractical.

SUMMARY OF THE INVENTION

An object of the present invention is to provide a high-accuracy, 1X VR resolver which has a simple structure and which can output a high accuracy rotational angle signal whose shaft angle multiplier is 1X.

In order to achieve the above object, the present invention employs the following means for solution.

A VR resolver according to the present invention has the following features. A rotor is formed by providing a first rotor portion and a second rotor portion on a rotary shaft in an axially connected state. The first rotor portion has (N−1) salient poles provided about a center axis at uniform angular intervals, where N is an arbitrary integer not less than 3. The second rotor portion has N salient poles provided about the center axis at uniform angular intervals. A stator is formed by a first stator portion and a second stator portion, which are disposed to face the corresponding rotor portions. Each of the first and second stator portions has a plurality of magnetic poles on which an input coil (excitation coil) and output coils for outputting a sin output signal and a cos output signal which have a phase difference of 90 degrees therebetween. The output coils are for a shaft angle multiplier of NX or (N−1)X.

Further, the VR resolver of the present invention is characterized in that a calculation for obtaining an angle by use of a general formula $\sin(\alpha-\beta)$ is performed by means of connection of the coils on the basis of the cosine theorem of a trigonometric function, where $\alpha$ and $\beta$ are arbitrary angles.

Specific means for solutions are shown below.

(1) A high-accuracy, 1X VR resolver comprising:

a first rotor portion having (N−1) salient poles provided about a center axis at uniform angular intervals, where N is an arbitrary integer not less than 3;

a second rotor portion having N salient poles provided about a center axis at uniform angular intervals, the first rotor portion and the second rotor portion being disposed on a rotary shaft and axially connected together;

a first stator portion having a plurality of magnetic poles which are provided to face the first rotor portion and on which an input coil and an output coil for a shaft angle multiplier of (N−1)X are provided; and a second stator portion having a plurality of magnetic poles which are provided to face the second rotor portion and on which an input coil and an output coil for a shaft angle multiplier of NX are provided, wherein the first rotor portion and the first stator portion constitute a first resolver unit; the second rotor portion and the second stator portion constitute a second resolver unit; one of the first and second resolver units is disposed in a front stage, and the other of the first and second resolver units is disposed in a rear stage; and the output coil of the stator portion in the front stage is connected to the input coil of the stator portion in the rear stage in such a manner that the output coil of the stator portion in the rear stage outputs an output signal for a shaft angle multiplier of 1×.

(2) A high-accuracy, 1X VR resolver as described in (1) above, wherein the input coil of one of the first and second stator portions consists of an excitation coil; the output coil of the one stator portion consists of a sin output coil for outputting a sin output signal and a cos output coil for outputting a cos output signal which has a phase difference of 90 degrees relative to the sin output signal; the input coil of the other of the first and second stator portions consists of a first input coil connected to the sin output coil and a second input coil connected to the cos output coil; and the output coil of the other stator portion consists of a first output coil for outputting a first output signal which is in phase with the first input signal supplied to the first input coil and has a phase difference of 90 degrees relative to the second input signal supplied to the second input coil, and a second output coil for outputting a second output signal which has a phase difference of 90 degrees relative to the first input signal supplied to the first input coil and is in phase with the second input signal supplied to the second input coil.

(3) A high-accuracy, 1X VR resolver as described in (1) above, wherein a single input coil and two output coils for outputting sin and cos output signals which have a phase difference of 90 degrees (electrical angle) therebetween are provided on the plurality of magnetic poles of one of the first and second stator portions; and two input coils and two output coils for outputting sin and cos output signals which have a phase difference of 90 degrees (electrical angle) therebetween are provided on the plurality of magnetic poles of the other of the first and second stator portions.

(4) A high-accuracy, 1X VR resolver as described in (1) above, wherein in order to enable the output coil of the stator portion in the rear stage to output an output signal E for the shaft angle multiplier of 1X, connection is established between the input and output coils of the second resolver unit, whose shaft angle multiplier is NX, and the input and output coils of the first resolver unit, whose shaft angle multiplier is (N−1)X, in such a manner that one of the following equations is satisfied. Notably, $\theta$ is an arbitrary angle.

$$E=-\sin(N-1)\theta.\cos N\theta+\cos(N-1)\theta.\sin N\theta$$

$$E=+\sin N\theta.\cos(N-1)\theta\cos N\theta.\sin(N-1)\theta$$

(5) A high-accuracy, 1X VR resolver as described in any one of (1) to (4) above, wherein the first and second stator portions are superposed together in such a manner that the magnetic poles of the first stator portion do not interfere with those of the second stator portion.

The VR resolver of the present invention has a rotor and a stator. The rotor is formed through axial connection of a first rotor portion and a second rotor portion. The first rotor portion has (N−1) salient poles, where N is an arbitrary integer not less than 3. The second rotor portion has N salient poles. The stator is formed by a first stator portion having an output coil for outputting an (N−1)X resolver signal and a second stator portion having an output coil for outputting an NX resolver signal. The coils are disposed while being shifted from one another so as to prevent interference therebetween, and are connected together so as to produce a 1X resolver signal. Thus, it becomes possible to incorporate into a single VR resolver two types of units each including a rotor portion and a stator portion. Further, since a calculation means or the like is unnecessary, the size of the resolver can be reduced, and the 1X resolver signal can be simply extracted.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 1A to 1C are views showing the configuration of a high-accuracy, 1X VR resolver according to the present invention, wherein FIG. 1A is a cross section of the resolver taken along a line IA—IA of FIG. 1B, FIG. 1B is a cross section of the resolver taken along a line IB—IB of FIG. 1A, and FIG. 1C is a side view of the resolver as viewed from a line IC—IC of FIG. 1A;

DESCRIPTION OF THE PREFERRED EMBODIMENTS

Figure 1A:
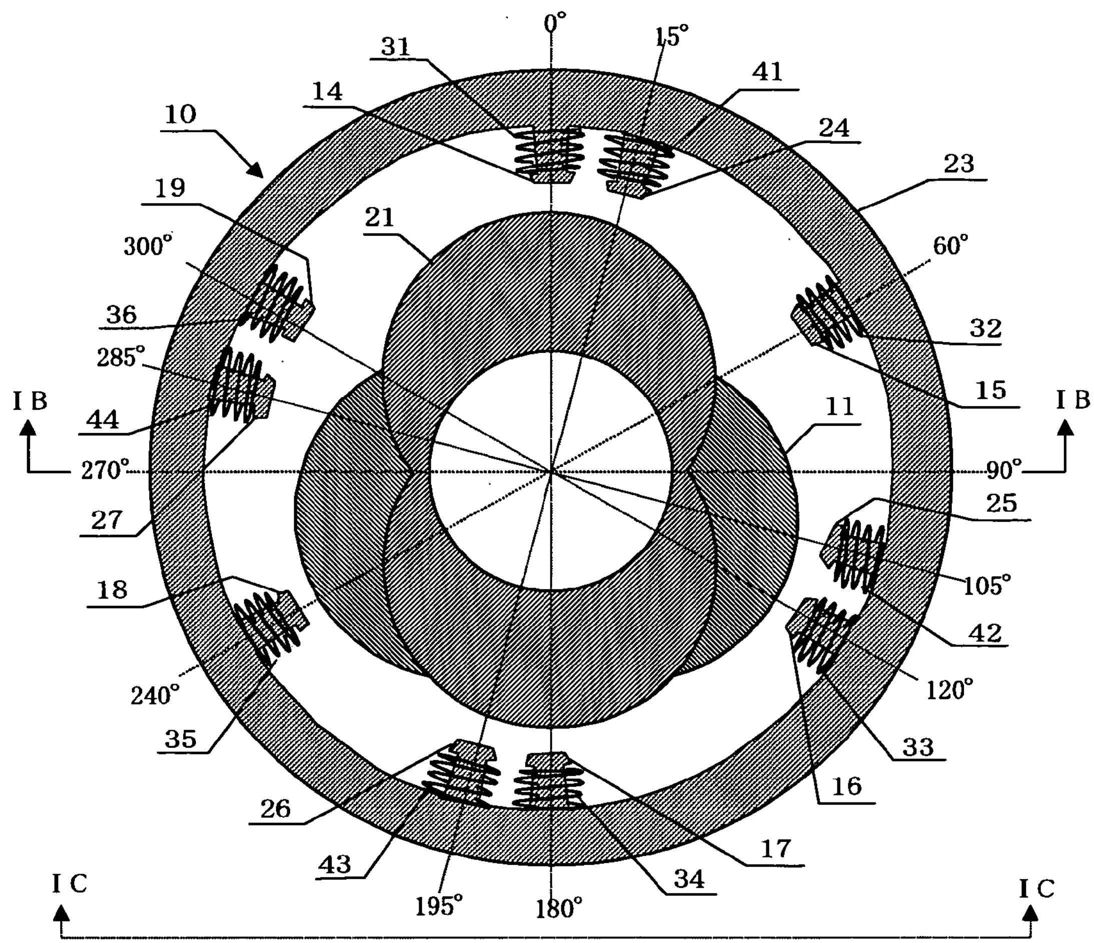

First, the characteristic features of the present invention will be described.

Feature 1: A high-accuracy, 1X VR resolver according to the present invention is formed from two types of resolver units, each of which includes a rotor portion and a stator portion, and from which an output for a shaft angle multiplier of NX and an output for a shaft angle multiplier of (N−1)X can be extracted, where N is an arbitrary integer not less than 3.

Feature 2: A connection configuration as described below is employed so as to connect magnetic pole coils of the two resolver units described in Feature 1 above, to thereby enable extraction of an output for a shaft angle multiplier of 1X from the outputs of the resolver units.

Feature 3: The positions of coil-carrying magnetic poles of one stator portion are angularly shifted from the positions of coil-carrying magnetic poles of the other stator portion so as to prevent interference between the coils of the stator portions.

Specifically, the high-accuracy, 1X VR resolver comprises:

- a first rotor portion having (N−1) salient poles provided about a center axis at uniform angular intervals, where N is an arbitrary integer not less than 3;
- a second rotor portion having N salient poles provided about a center axis at uniform angular intervals, the first rotor portion and the second rotor portion being disposed on a rotary shaft and axially connected together;
- a first stator portion having a plurality of magnetic poles which are provided to face the first rotor portion and on which an input coil and an output coil for a shaft angle multiplier of (N−1)X are provided; and
- a second stator portion having a plurality of magnetic poles which are provided to face the second rotor portion and on which an input coil and an output coil for a shaft angle multiplier of NX are provided,
  wherein the first rotor portion and the first stator portion constitute a first resolver unit; the second rotor portion and the second stator portion constitute a second resolver unit; one of the first and second resolver units is disposed in a front stage, and the other of the first and second resolver units is disposed in a rear stage; and the output coil of the stator portion in the front stage is connected to the input coil of the stator portion in the rear stage in such a manner that the output coil of the stator portion in the rear stage outputs an output signal for a shaft angle multiplier of 1X.

In the high-accuracy, 1X VR resolver, the input coil of one of the first and second stator portions consists of an excitation coil; the output coil of the one stator portion consists of a sin output coil for outputting a sin output signal and a cos output coil for outputting a cos output signal which has a phase difference of 90 degrees relative to the sin output signal; the input coil of the other of the first and second stator portions consists of a first input coil connected to the sin output coil and a second input coil connected to the cos output coil; and the output coil of the other stator portion consists of a first output coil for outputting a first output signal which is in phase with the first input signal supplied to the first input coil and has a phase difference of 90 degrees relative to the second input signal supplied to the second input coil, and a second output coil for outputting a second output signal which has a phase difference of 90 degrees relative to the first input signal supplied to the first input coil and is in phase with the second input signal supplied to the second input coil.

In the high-accuracy, 1X VR resolver, a single input coil and two output coils for outputting sin and cos output signals which have a phase difference of 90 degrees (electrical angle) therebetween are provided on the plurality of magnetic poles of one of the first and second stator portions; and two input coils and two output coils for outputting sin and cos output signals which have a phase difference of 90 degrees (electrical angle) therebetween are provided on the plurality of magnetic poles of the other of the first and second stator portions.

In the high-accuracy, 1X VR resolver, in order to enable the output coil of the stator portion in the rear stage to output an output signal E for the shaft angle multiplier of 1X, connection is established between the input and output coils of the second resolver unit, whose shaft angle multiplier is NX, and the input and output coils of the first resolver unit, whose shaft angle multiplier is (N−1)X, in such a manner that one of the following equations is satisfied. Notably, θ is an arbitrary angle.

$$E=-\sin(N-1)\theta.\cos N\theta+\cos(N-1)\theta.\sin N\theta$$

$$E=+\sin N\theta.\cos(N-1)\theta-\cos N\theta.\sin(N-1)\theta$$

In the high-accuracy, 1X VR resolver, the first and second stator portions are superposed together in such a manner that the magnetic poles of the first stator portion do not interfere with those of the second stator portion.

First Embodiment

Figure 1B:
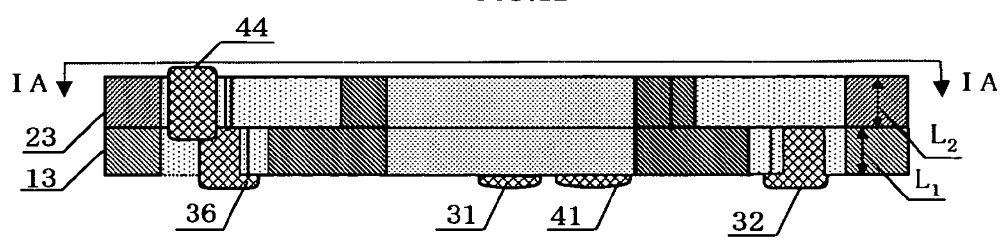
Figure 1C:
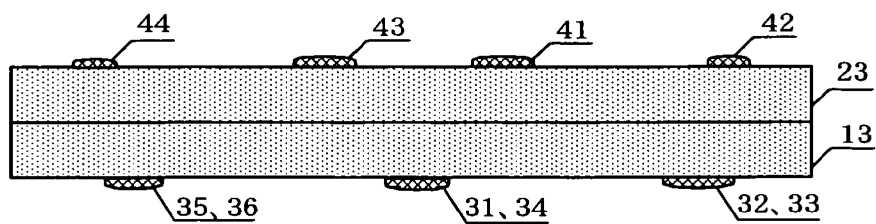

FIGS. 1A to 1C are views showing the configuration of a high-accuracy, 1X VR resolver according to the present invention, wherein FIG. 1A is a cross section of the resolver taken along a line IA—IA of FIG. 1B, FIG. 1B is a cross section of the resolver taken along a line IB—IB of FIG. 1A, and FIG. 1C is a side view of the resolver as viewed from a line IC—IC of FIG. 1A.

Figure 2B:
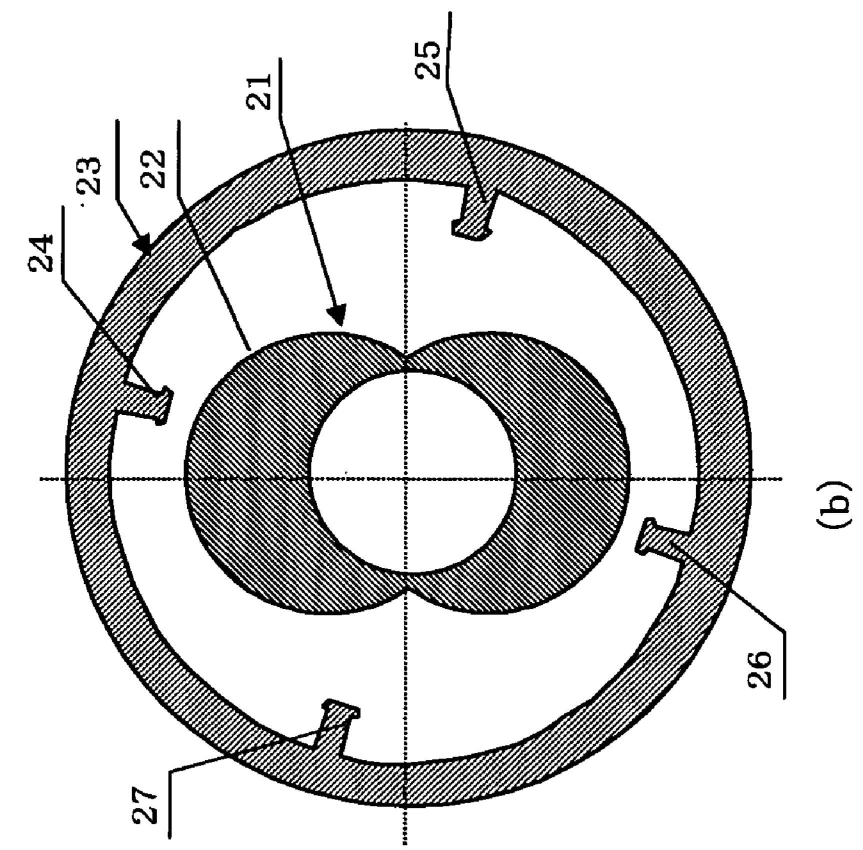
FIGS. 2A and 2B are sectional views showing the structures of a 2X resolver unit and a 3X resolver unit of the high-accuracy, 1X VR resolver.
Figure 2A:
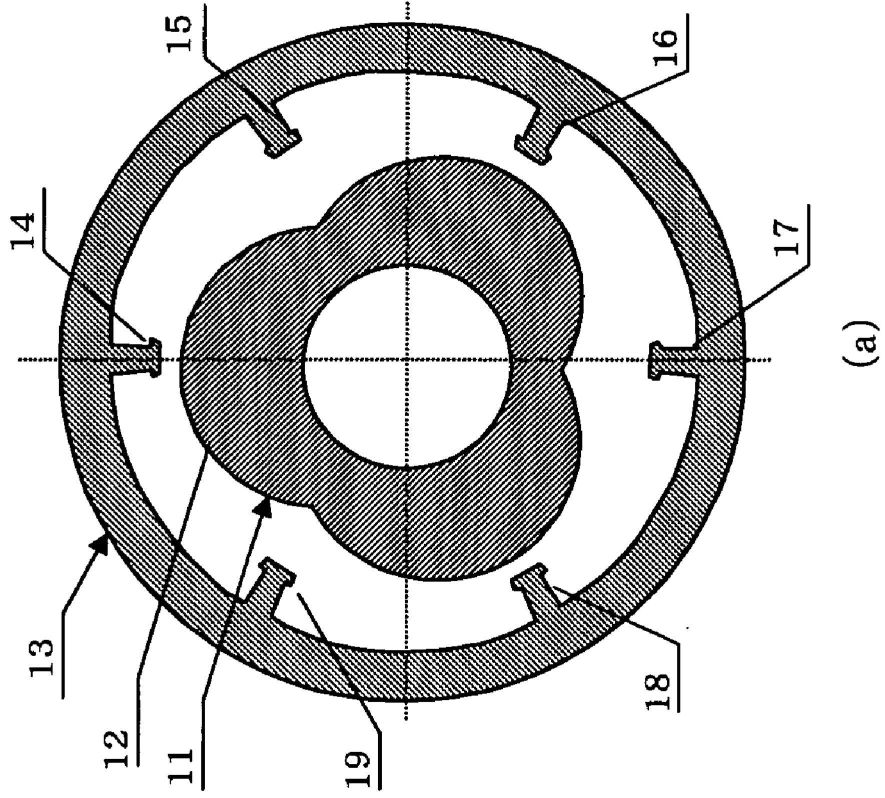

FIGS. 2A and 2B are sectional views showing the structures of a 2X resolver unit and a 3X resolver unit of the high-accuracy, 1X VR resolver.

A first embodiment to be described below exemplifies the case where N is 3; i.e., the shaft angle multiplier of NX is a shaft angle multiplier of 3X, and the shaft angle multiplier of (N−1)X is a shaft angle multiplier of 2×.

As shown in FIGS. 2A and 2B, a VR resolver 10 of the first embodiment consists of first and second resolver units superposed together. The first resolver unit includes a first rotor portion 11, and a first stator portion 13 surrounding the first rotor portion 11. The second resolver unit includes a second rotor portion 21, and a second stator portion 23 surrounding the second rotor portion 21.

The rotor is formed from the first rotor portion 11 and the second rotor portion 21. The first rotor portion 11 has three salient poles 12. The second rotor portion 21 has two salient poles 22. The first rotor portion 11 and the second rotor portion 21 are disposed to be located adjacent to each other in the axial direction. The stator portions 13 and 23 have magnetic poles whose numbers correspond to respective shaft angle multipliers, and are stacked together in the axial direction.

Stator

An axial thicknesses L1 and L2 of the stator portions 13 and 23 shown in FIG. 1B may be set arbitrarily; however, in the first embodiment, the thicknesses L1 and L2 are equal.

When the stator portions 13 and 23 are stacked together, their positional relationship in the circumferential direction is adjusted in such a manner that coils 31 to 36 and 41 to 44 wound around magnetic poles 14 to 19 and 24 to 27 of the stator portions 13 and 23 are not located at the same angular positions. That is, the angular positions of the coils are shifted from one another such that the stator portions 13 and 23 can be stacked together without occurrence of interference among the coils.

For such purpose, the magnetic poles 14 to 19 and 24 to 27 of the stator portions 13 and 23 are positioned as follows. In the present embodiment, the first magnetic pole 14 of the stator portion 13 for the shaft angle multiplier of 3× (hereinafter referred to as "3X stator portion 13") is located at an angular position of 0° and the first magnetic pole 24 of the stator portion 23 for the shaft angle multiplier of 2X (hereinafter referred to as "2X stator portion 23") is shifted clockwise to be located at an angular position of 15°. As shown in FIG. 2A, the magnetic poles 14 to 19 of the 3X stator portion 13 are provided at intervals of 600; i.e., at angular positions of 0°, 60°, 120°, 180°, 240°, and 300°, respectively. An excitation coil, a sin (sine) coil, and a cos (cosine) coil are wound around the magnetic poles 14 to 19 such that a phase difference of 90° (electrical angle) is provided between the sin and cos coils.

As shown in FIG. 2B, the magnetic poles 24 to 27 of the 2X stator portion 23 are provided at angular positions of 15°, 105°, 195°, and 285°, respectively. An excitation coil, a sin (sine) coil, and a cos (cosine) coil are wound around the magnetic poles 24 to 27 such that a phase difference of 90° (electrical angle) is provided between the sin and cos coils.

As shown in FIG. 1B, the coils 31 to 36 project from opposite sides of the stator portion 13 having an axial thickness L1, and the coils 41 to 44 project from opposite sides of the stator portion 23 having an axial thickness L2. The positions of the magnetic poles are determined so as to prevent mutual interference of projecting portions of the coils 31 to 36 and 41 to 44. As a result, as shown in FIG. 1C, the stator portions 13 and 23 are joined together with no clearance therebetween.

The zero-degree positions of the stator portions 13 and 23 are arbitrarily set through reactance adjustment; i.e., through adjustment of the numbers of turns of coils wound around the respective magnetic poles and the initially set rotational angles (offset amounts) of the rotor portions. In the first embodiment, the zero-degree positions are set to the 12 o'clock position.

In the first embodiment, the zero-degree positions of the stator portions 13 and 23 are set at the same position by means of aligning the centers of first salient poles of the respective rotors, and adjusting the numbers of turns of coils wound around the respective magnetic poles.

The coils for the shaft angle multiplier of 2X and those for the shaft angle multiplier of 3X are separately provided and wound around the corresponding magnetic poles. Further, the output coil of each resolver unit consists of a sin wave output coil and a cos wave output coil which are wound around the corresponding magnetic poles in such a manner that a phase difference of 90 degrees (electrical angle) is provided between the two output coils.

The output coil for the shaft angle multiplier of 3× provided on the magnetic poles of the stator portion 13 consists of a sin output coil W7 and a cos output coil W6, which will be described later.

The 2X resolver unit in the front stage has a single input coil, serving as an excitation coil. The 3X resolver unit in the rear stage has two input coils which are wound around the corresponding magnetic poles in such a manner that a phase difference of 90 degrees (electrical angle) is provided between the two input coils.

Rotor

The 2X rotor portion 21, which has no coil, is formed of silicon steel and has two plate-shaped salient poles 22 disposed symmetrically with respect to the center axis. The 3X rotor portion 11, which has no coil, is formed of silicon steel and has three plate-shaped salient poles 12 disposed at uniform angular intervals about the center axis. The 2× rotor portion 21 and the 3X rotor portion 11 are superposed on each other along the axial direction to thereby complete the rotor. The 2X rotor portion 21 and the 3X rotor portion 11 may be formed separately or integrally; i.e., as a single member.

In the present embodiment, the thicknesses of the rotor portions 11 and 21 are made substantially equal to the thicknesses L1 and L2 of the stator portions 13 and 23. In the present embodiment, since the first magnetic pole 14 of the 3X stator portion 13 is set to 00, as shown in FIGS. 1A and 2A, the center of the first salient pole 12 of the 3× rotor portion 11 is aligned with 0°, and the center of the first salient pole 22 of the 2X rotor portion 21 is also aligned with 0°. Notably, since the angular positions of these salient poles are determined in accordance with variation in reluctance, the angular positions of these salient poles are not limited to those employed in the first embodiment, and may be freely set through adjustment of various parameters which determine the reluctance.

Other Set Angular Positions

Examples of possible angular positions, other than the above-described set angular positions, of the stator and the rotor shown in the first embodiment are listed below.

EXAMPLE 1

Magnetic poles of the 3X stator portion: 6 poles at intervals of 60° (identical with those in the first embodiment)

Magnetic poles of the 2X stator portion: 45°, 135°, 225°, 315°

Salient poles of the 3X rotor portion: the center of the first salient pole is located at 0°.

Salient poles of the 2X rotor portion: the center of the first salient pole is located at 45°.

EXAMPLE 2

Magnetic poles of the 3X stator portion: 6 poles at intervals of 60°(identical with those in the first embodiment)

Magnetic poles of the 2X stator portion: 75°, 165°, 255°, 345°

Salient poles of the 3X rotor portion: the center of the first salient pole is located at 0°.

Salient poles of the 2X rotor portion: the center of the first salient pole is located at 75°.

Second Embodiment

1X Signal

In the present invention, in principle, the coils of the (N−1)X resolver and the coils of the NX resolver are connected in such a manner that a 1X voltage signal can be extracted on the basis of the cosine theorem. The term "the cosine theorem" used herein refers to the following general formula:

$$\sin(\alpha-\beta)=\sin\alpha.\cos\beta-\cos\alpha.\sin\beta$$

where α and β are arbitrary angles which are selected to satisfy the requirement that the value of (α−β) becomes equal to a rotational angle θ.

The 2X resolver unit in the front stage has a single input coil, serving as an excitation coil. The 3X resolver unit in the rear stage has two input coils which are wound in such a manner that a phase difference of 90 degrees (electrical angle) is provided between the two input coils.

Figure 3:
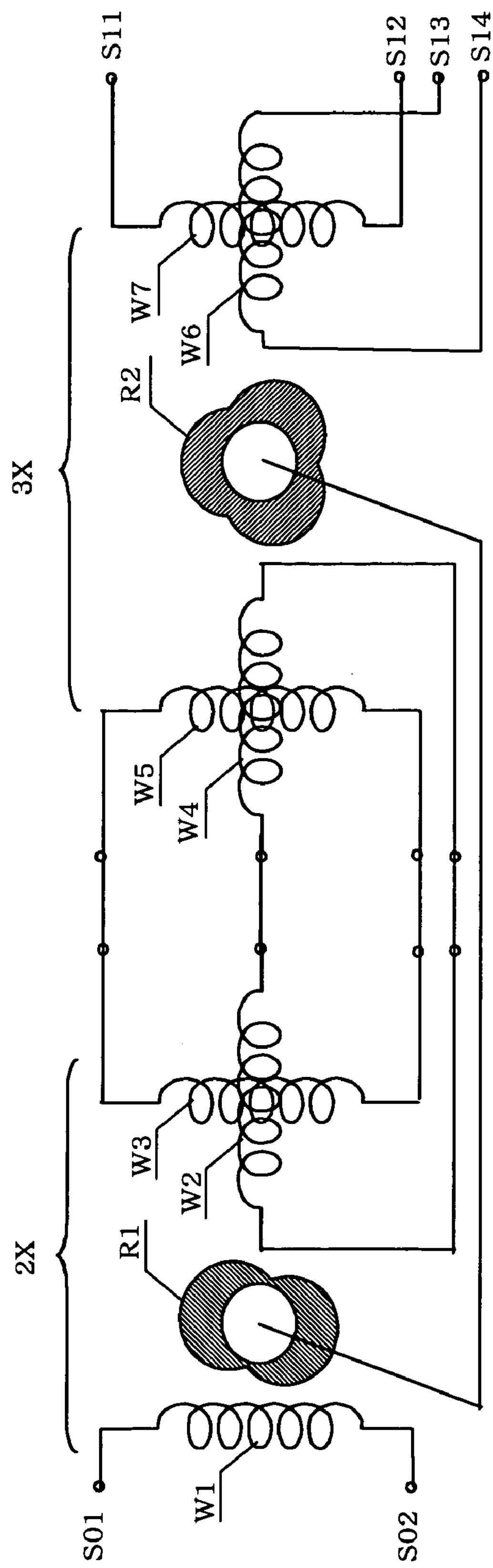
FIG. 3 is a diagram showing the connection of coils of the 2X resolver unit and the 3X resolver unit which enables extraction of a 1X voltage signal on the basis of the cosine theorem.

FIG. 3 is a diagram showing the connection of coils of the 2X resolver unit and the 3X resolver unit which enables extraction of a 1X voltage signal on the basis of the cosine theorem.

Although the coils may be connected together in various manners, in the second embodiment, the 2X resolver unit is provided in the front stage, the 3X resolver unit is provided in the rear stage, and these resolver units are connected together as shown in FIG. 3.

Coils W2 and W3 have a phase difference of 90 degrees (electrical angle) therebetween, coils W4 and W5 have a phase difference of 90 degrees (electrical angle) therebetween, and the coils W6 and W7 have a phase difference of 90 degrees (electrical angle) therebetween.

In the example shown in FIG. 3, the 2X resolver unit is configured in such a manner that a coil W1 serves as an excitation coil, the coil W2 serves as an output coil (e.g., a sin output coil), and the coil W3 serves as another output coil (e.g., a cos output coil), whereas the 3X resolver unit is configured in such a manner that the coil W4 serves as an input coil (for receiving the sin output from the coil W2), the coil W5 serves as another input coil (for receiving the cos output from the coil W3), the coil W6 serves as an output coil (cos output coil), and the coil W7 serves as another output coil (sin output coil).

In such a configuration, the above-described coils receive and output the following signals.

(N−1)X Resolver Unit

When an excitation signal E1 as described below is supplied to the excitation coil (W1), the output sin coil (W2) and the output cos coil (W3) output a sin output signal (Es1) and a cos output signal (Ec1), respectively, which are represented by the following formulae.

Input: excitation signal: $E1=E_0\sin\omega t$

Output: sin output signal: $Es1=K1.E_0\sin\omega t.\sin(N-1)\theta$

Output: cos output signal: $Ec1=K1.E_0\sin\omega.\cos(N-1)\theta$

In the above formulae, K1 represents a transformer ratio, and θ represents a rotational angle.

NX Resolver Unit

When a sin input (Es1) and a cos input (Ec1) as shown below are supplied to the sin input coil (W4) and the cos input coil (W5), the output sin coil (W7) and the output cos coil (W6) output a sin output signal (Es2) and a cos output signal (Ec2), respectively, which are represented by the following formulae.

Input: sin input signal: $Es1=K1.E_0\sin\omega t.\sin(N-1)\theta$

Input: cos input signal: $Ec1=K1.E_0\sin\omega t.\cos(N-1)\theta$ $$\begin{aligned}
Es2 &= -Es1\cdot K2\cdot\cos N\theta + Ec1\cdot K2\cdot\sin N\theta \\
&= K1\cdot K2\cdot\{E_0\sin\omega t\}\cdot\{-\sin(N-1)\theta\cdot\cos N\theta + \\
&\quad \cos(N-1)\theta\cdot\sin N\theta\} \\
&= K1\cdot K2\cdot\{E_0\sin\omega t\}\cdot\sin\{N-(N-1)\}\theta \\
&= K1\cdot K2\cdot\{E_0\sin\omega t\}\cdot\sin\theta \\
Ec2 &= Es1\cdot K2\cdot\sin N\theta + Ec1\cdot K2\cdot\cos N\theta \\
&= K1\cdot K2\cdot\{E_0\sin\omega t\}\cdot\{\sin(N-1)\theta\cdot\sin N\theta + \\
&\quad \cos(N-1)\theta\cdot\cos N\theta\} \\
&= K1\cdot K2\cdot\{E_0\sin\omega t\}\cdot\cos\{N-(N-1)\}\theta \\
&= K1\cdot K2\cdot\{E_0\sin\omega t\}\cdot\cos\theta
\end{aligned}$$

In the above formulae, K2 represents a transformer ratio, and θ represents the rotational angle.

Subsequently, the transformer ratios K1 and K2 are rendered to 1, and the output signals Es2 and Ec2 are demodulated with a signal identical with the excitation signal by means of a synchronous detector. As a result, the output signals Es2 and Ec2 are converted to the following signals which vary in proportion to sinθ and cosθ, respectively.

$$Es2=(E_0).\sin\theta$$

$$Ec2=(E_0).\cos\theta$$

The output signal Es2, which is a sine wave signal, serves as a 1X resolver signal. The output signal Ec2 may be used in place of the output signal Es2. In such a case, the phase difference of 90 degrees is taken into consideration.

Effects of the Second Embodiment

Through connecting the respective coils such that a 1X voltage signal is extracted on the basis of the cosine theorem, such a 1X voltage signal can be obtained by a simple configuration without provision of conventionally used calculation means or the like for processing output signals of the coils.

Since the stator magnetic poles are shifted from one another so as to prevent overlapping along the axial direction, the stator portions can be disposed in a stacked condition.

Third Embodiment

In the second embodiment, the 2X resolver unit is provided in the front stage, and the 3X resolver unit is provided in the rear stage. In contrast, in the present embodiment, the 3X resolver unit is provided in the front stage, and the 2X resolver unit is provided in the rear stage. In this case, these units are connected in such a manner that a sin output signal Es2 shown below is output between terminals S11 and S12, and a cos output signal Ec2 shown below is output between terminals S13 and S14.

$$\begin{aligned} Es2 &= +Es1\cdot K2\cdot\cos(N-1)\theta - Ec1\cdot K2\cdot\sin(N-1)\theta \\ &= K1\cdot K2\cdot\{E_0\sin\omega t\}\cdot\{+\sin N\theta\cdot\cos(N-1)\theta - \\ &\quad \cos N\theta\cdot\sin(N-1)\theta\} \\ &= K1\cdot K2\cdot\{E_0\sin\omega t\}\cdot\sin\{N-(N-1)\}\theta \\ &= K1\cdot K2\cdot\{E_0\sin\omega t\}\cdot\sin\theta \\ Ec2 &= Es1\cdot K2\cdot\sin(N-1)\theta + Ec1\cdot K2\cdot\cos(N-1)\theta \\ &= K1\cdot K2\cdot\{E_0\sin\omega t\}\cdot\{\sin N\theta\cdot\sin(N-1)\theta + \\ &\quad \cos N\theta\cdot\cos(N-1)\theta\} \\ &= K1\cdot K2\cdot\{E_0\sin\omega t\}\cdot\cos\{N-(N-1)\}\theta \\ &= K1\cdot K2\cdot\{E_0\sin\omega t\}\cdot\cos\theta \end{aligned}$$

The output signal Es2 is used as a 1X resolver signal. Instead of the output signal Es2, the output signal Ec2 may be used with consideration of the phase difference of 90 degrees.

Effects of the Third Embodiment

As in the second embodiment, through connecting the respective coils in a predetermined manner, a high-accuracy 1X rotational angle signal can be obtained by a simple configuration.

The present invention can be applied to other types of measurement devices, such as rotation sensors, and angle measurement apparatus, which obtain rotational angular positions in the same manner as in the present invention.

The number of salient poles of one rotor and the number of salient poles of the other rotor may be determined freely, so long as the first number is N and the second number is N−1, where N is an arbitrary integer equal to or greater than 3.

Obviously, numerous modifications and variations of the present invention are possible in light of the above teachings. It is therefore to be understood that within the scope of the appended claims, the present invention may be practiced otherwise than as specifically described herein.

What is claimed is:

1. A high-accuracy, 1X VR resolver comprising:

a first rotor portion having (N−1) salient poles provided about a center axis at uniform angular intervals, where N is an arbitrary integer not less than 3;

a second rotor portion having N salient poles provided about the center axis at uniform angular intervals, the first rotor portion and the second rotor portion being disposed on a rotary shaft and axially connected together;

a first stator portion having a plurality of magnetic poles which are provided to face the first rotor portion and on which an input coil and an output coil for a shaft angle multiplier of (N−1)X are provided; and a second stator portion having a plurality of magnetic poles which are provided to face the second rotor portion and on which an input coil and an output coil for a shaft angle multiplier of NX are provided, wherein the first rotor portion and the first stator portion constitute a first resolver unit; the second rotor portion and the second stator portion constitute a second resolver unit; one of the first and second resolver units is disposed in a front stage, and the other of the first and second resolver units is disposed in a rear stage; and the output coil of the stator portion in the front stage is connected to the input coil of the stator portion in the rear stage in such a manner that the output coil of the stator portion in the rear stage outputs an output signal for a shaft angle multiplier of 1X.

2. A high-accuracy, 1X VR resolver according to claim 1, wherein the input coil of one of the first and second stator portions consists of an excitation coil; the output coil of the one stator portion consists of a sin output coil for outputting a sin output signal and a cos output coil for outputting a cos output signal which has a phase difference of 90 degrees relative to the sin output signal; the input coil of the other of the first and second stator portions consists of a first input coil connected to the sin output coil and a second input coil connected to the cos output coil; and the output coil of the other stator portion consists of a first output coil for outputting a first output signal which is in phase with the first input signal supplied to the first input coil and has a phase difference of 90 degrees relative to the second input signal supplied to the second input coil, and a second output coil for outputting a second output signal which has a phase difference of 90 degrees relative to the first input signal supplied to the first input coil and is in phase with the second input signal supplied to the second input coil.

3. A high-accuracy, 1X VR resolver according to claim 1, wherein a single input coil and two output coils for outputting sin and cos output signals which have a phase difference of 90 degrees (electrical angle) therebetween are provided on the plurality of magnetic poles of one of the first and second stator portions; and two input coils and two output coils for outputting sin and cos output signals which have a phase difference of 90 degrees (electrical angle) therebetween are provided on the plurality of magnetic poles of the other of the first and second stator portions.

4. A high-accuracy, 1X VR resolver according to claim 1, wherein in order to enable the output coil of the stator portion in the rear stage to output the output signal for the shaft angle multiplier of 1X, connection is established between the input and output coils of the second resolver unit, whose shaft angle multiplier is NX, and the input and output coils of the first resolver unit, whose shaft angle multiplier is (N−1)X, in such a manner that one of the following equations is satisfied:

$$E=-\sin(N-1)\theta.\cos N\theta+\cos(N-1)\theta.\sin N\theta$$

$$E=+\sin N\theta.\cos(N-1)\theta-\cos N\theta\sin(N-1)\theta$$

where θ is an arbitrary angle.

5. A high-accuracy, 1X VR resolver according to claim 1, wherein the first and second stator portions are superposed together in such a manner that the magnetic poles of the first stator portion do not interfere with those of the second stator portion.

6. A high-accuracy, 1X VR resolver according to claim 2, wherein the first and second stator portions are superposed together in such a manner that the magnetic poles of the first stator portion do not interfere with those of the second stator portion.

7. A high-accuracy, 1X VR resolver according to claim 3, wherein the first and second stator portions are superposed together in such a manner that the magnetic poles of the first stator portion do not interfere with those of the second stator portion.

8. A high-accuracy, 1X VR resolver according to claim 4, wherein the first and second stator portions are superposed together in such a manner that the magnetic poles of the first stator portion do not interfere with those of the second stator portion.

* * * * *